United States Patent
Tychon et al.

(10) Patent No.: US 8,116,200 B2
(45) Date of Patent: Feb. 14, 2012

(54) SOURCE ROUTING APPROACH FOR NETWORK PERFORMANCE AND AVAILABILITY MEASUREMENT OF SPECIFIC PATHS

(75) Inventors: Emmanuel P. Tychon, Fexhe-le Haut-Clocher (BE); Benoit Claise, Crisnee (BE)

(73) Assignee: Cisco Technology, Inc., San Jose, CA (US)

( * ) Notice: Subject to any disclaimer, the term of this patent is extended or adjusted under 35 U.S.C. 154(b) by 942 days.

(21) Appl. No.: 11/687,513

(22) Filed: Mar. 16, 2007

(65) Prior Publication Data

US 2008/0225713 A1 Sep. 18, 2008

(51) Int. Cl.
*H04L 12/26* (2006.01)

(52) U.S. Cl. .................. 370/231; 370/238; 370/241
(58) Field of Classification Search .................. None
See application file for complete search history.

(56) References Cited

U.S. PATENT DOCUMENTS

| | | | |
|---|---|---|---|
| 5,781,534 A * | 7/1998 | Perlman et al. | 370/248 |
| 6,363,319 B1 * | 3/2002 | Hsu | 701/202 |
| 6,545,979 B1 * | 4/2003 | Poulin | 370/241.1 |
| 6,662,223 B1 | 12/2003 | Zhang et al. | |
| 6,868,094 B1 * | 3/2005 | Bordonaro et al. | 370/516 |
| 2002/0039370 A1 * | 4/2002 | Elliot | 370/503 |
| 2002/0145981 A1 * | 10/2002 | Klinker et al. | 370/244 |
| 2003/0086422 A1 * | 5/2003 | Klinker et al. | 370/389 |
| 2006/0104217 A1 | 5/2006 | Lehane | |
| 2006/0146717 A1 * | 7/2006 | Conner et al. | 370/238 |

* cited by examiner

*Primary Examiner* — Chirag Shah
*Assistant Examiner* — Steve Young
(74) *Attorney, Agent, or Firm* — P. Su

(57) ABSTRACT

In one embodiment, a method includes obtaining a first packet that has a first payload. The first payload identifies a first path between endpoints traversed by the first packet, and identifying information associated with a first node associated with the first path traversed by the first packet. The identifying information includes an arrival time that identifies approximately when the first packet arrived at the first node and a leaving time that identifies approximately when the first packet left the first node. A first service level agreement (SLA) parameter of the first path is determined by analyzing the arrival time and the leaving time, comparing the first SLA parameter with a second SLA parameter associated with a second path traversed by a second probe packet, and selecting the first path for sending packets if the first SLA parameter indicates a higher SLA level than indicated by the second SLA parameter.

22 Claims, 9 Drawing Sheets

US 8,116,200 B2

SOURCE ROUTING APPROACH FOR NETWORK PERFORMANCE AND AVAILABILITY MEASUREMENT OF SPECIFIC PATHS

CROSS REFERENCE TO RELATED APPLICATION

The present invention is related to co-pending U.S. patent application Ser. No. 11/456,467, filed Jul. 10, 2006, which is incorporated herein by reference in its entirety.

BACKGROUND OF THE INVENTION

Source routing enables a sender, as for example an originator, of a packet to specify a path or a route for the packet to traverse through a network en route to a destination. Parameters such as packet loss, one-way delay, and jitter may affect the performance associated with and service provided by a path. That is, a path from a source to a destination may be subjected to delays and/or jitter as well as packet loss that may render the particular path to be less desirable than another path from the source to the destination from an internet protocol (IP) service level agreement (SLA) standpoint. When a theoretical "best" path in a overall system, e.g., a path that would be substantially optimal in the absence of packets loss, delays, and/or jitter, that is in use may not be the best path to use from an IP SLA standpoint, the ability to identity a better alternate path would allow improve performance in the overall system.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

General Overview

Figure 1A:
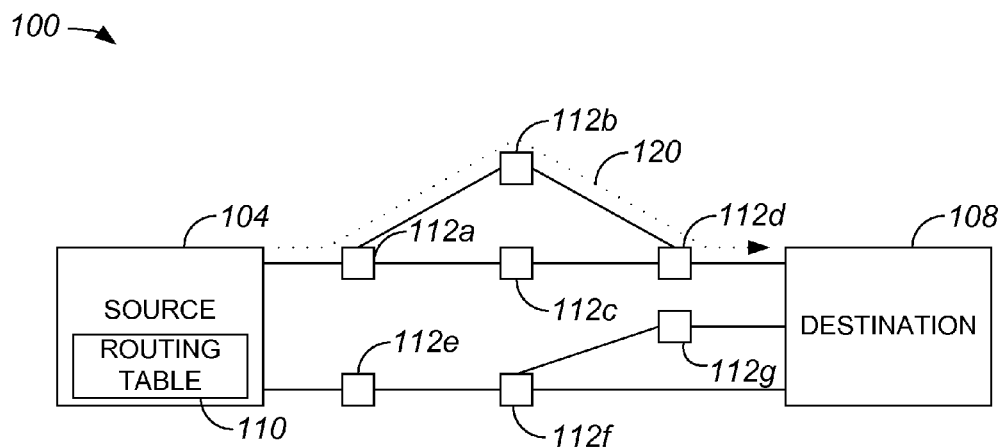
FIG. 1A is a diagrammatic representation of a core network with a selected or default path between a source and a destination in accordance with an embodiment of the present invention.

In one embodiment, a method includes obtaining a first packet that has a first payload. The first payload identifies a first path between endpoints traversed by the first packet, and identifying information associated with a first node associated with the first path traversed by the first packet. The identifying information includes an arrival time that identifies approximately when the first packet arrived at the first node and a leaving time that identifies approximately when the first packet left the first node. A first service level agreement (SLA) parameter of the first path is determined by analyzing the arrival time and the leaving time, comparing the first SLA parameter with a second SLA parameter associated with a second path traversed by a second probe packet, and selecting the first path for sending packets if the first SLA parameter indicates a higher SLA level than indicated by the second SLA parameter.

DESCRIPTION

Paths may be subjected to delays and/or jitter as well as packet loss that may render a given path as being less desirable than other paths from an internet protocol (IP) service level agreement (SLA) standpoint. Network characteristics such as delays and jitter associated with a link traversed by a packet may generally be identified by determining how long a packet remains at each node or hop traversed by the packet. By providing information in a packet that indicates how long the packet remains at each node in a path, network characteristics associated with the path may be ascertained. Hence, if probe packets are sent on a plurality of paths between a source endpoint and a destination endpoint, the network characteristics associated with each of the plurality of paths may be used to effectively identify the best path to use with respect to a given SLA.

A plurality of paths between a source and a destination may be traversed by a probe packet such that the destination receives a plurality of probe packets. In one embodiment, the number of probe packets received at a destination may correspond to the total number of working paths between the source and the destination. Hence, if information pertaining to the path traversed by a probe packet between two points is provided in the probe packet, that information may be compared to information provided in probe packets that traversed other paths between the two points such that the best path for use in sending packets between the two points may be determined.

By providing information relating to the amount of time a probe packet remains at each hop, network characteristics such as jitter and delays may be determined for the path traversed by the probe packet. In other words, network characteristics associated with a SLA may be determined for the path. For example, by timestamping a packet as the packet leaves one hop and timestamping the packet again when the packet arrives at another hop, a delay and jitter associated with a link between the hops may be determined. Further, by providing information that identifies each hop traversed by the probe packet, the path traversed by the probe packet may be readily identified in addition to network characteristics associated with the path.

Information that may be used to determine jitter and delays, as well as information that identifies each hop traversed by a probe packet, may be stored in the probe packet. Packet loss may be determined by sending multiple packets that contain a sequence number in their associated payloads. Additionally, packet loss information may be collected at each hop from a local statistics database associated with the hop. As a number of packets that is sent by a first node to a second node is known, the second node may determine how many packets were lost during transmission from the first node. In one embodiment, timestamps and addresses, e.g., IP addresses, are stored by each hop traversed by a probe packet in the payload of the probe packet. The ability to add timestamps and addresses to the payload of a probe packet may be provided by a responder functionality block of each node in a path. In another embodiment, rather than add an address to a payload of a probe packet, a hop may provide substantially any suitable indication that the probe packet traversed the hop.

FIG. 1A is a diagrammatic representation of a network with a selected path that is to be used to forward packets from a source to a destination in accordance with an embodiment of the present invention. In a network 100 between a source 104 and a destination 108, there may be any number of paths. A routing table 110 associated with source 104 may identify a path 120 as a chosen path for use in sending packets from source 104 to destination 108. Path 120 traverses nodes 112a, 112b, 112d, and may be identified in routing table 110 as a chosen path from source 104 to destination 108 for substantially any suitable reason. Suitable reasons may include, but are not limited to, load-balancing concerns within network 100 and expected times associated with sending a packet from source 104 to destination 108 in an environment with no delays and no failures.

Routing table 110 may specify alternate paths from source 104 to destination 108. Other alternate paths from source 104 to destination 108 may not necessarily be specified in routing table 110, as for example if a loose source routing protocol is implemented. As will be appreciated by those skilled in the art, a loose source routing protocol may specify certain nodes in sequential order 112a-g that are to be traversed as a part of a path, but may not specify other nodes 112a-g. Hence, alternate paths are effectively not specified in routing table 110 if only a subset of the nodes 112a-g included in an alternate path are specified.

Figure 1B:
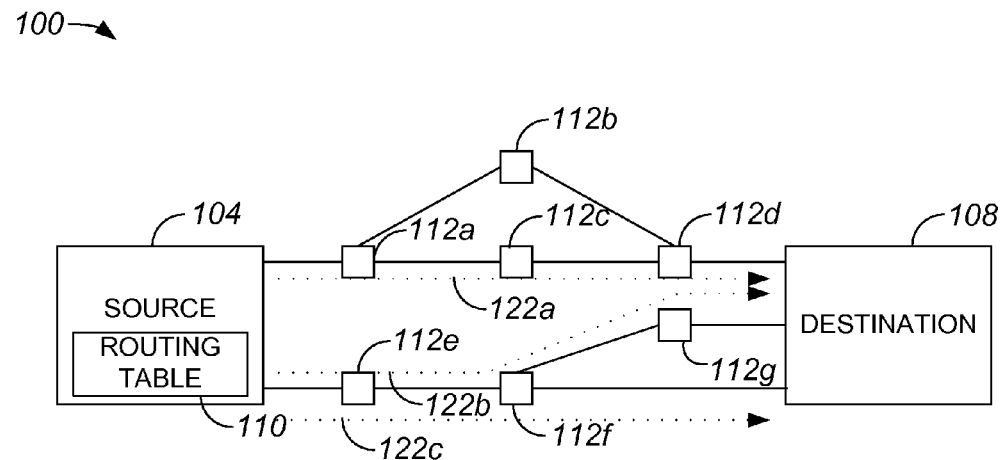
FIG. 1B is a diagrammatic representation of a core network, i.e., core network 100 of FIG. 1A, with a plurality of alternate paths from a source to a destination in accordance with an embodiment of the present invention.

Typically, when source 104 sends a packet to destination 108, the packet may be sent on any path between source 104 and destination 108. As shown in FIG. 1B, network 100 may includes alternate paths 122a-c between source 104 and destination 108. In order to determine whether any of paths 122a-c is preferable to path 120 of FIG. 1A, as for example because one of paths 122a-c has a better level of service that that of path 120 which is subjected to performance degradation, probe packets may be sent on each available path between source 104 and destination 108. By identifying the nodes 112a-g which are traversed by each probe packet, e.g., identifying nodes 112e-g in a probe packet that traverses path 122b, the nodes 112a-g in a given path 122a-c may be readily identified by studying a probe packet that traversed the given path 122a-c.

Figure 2:
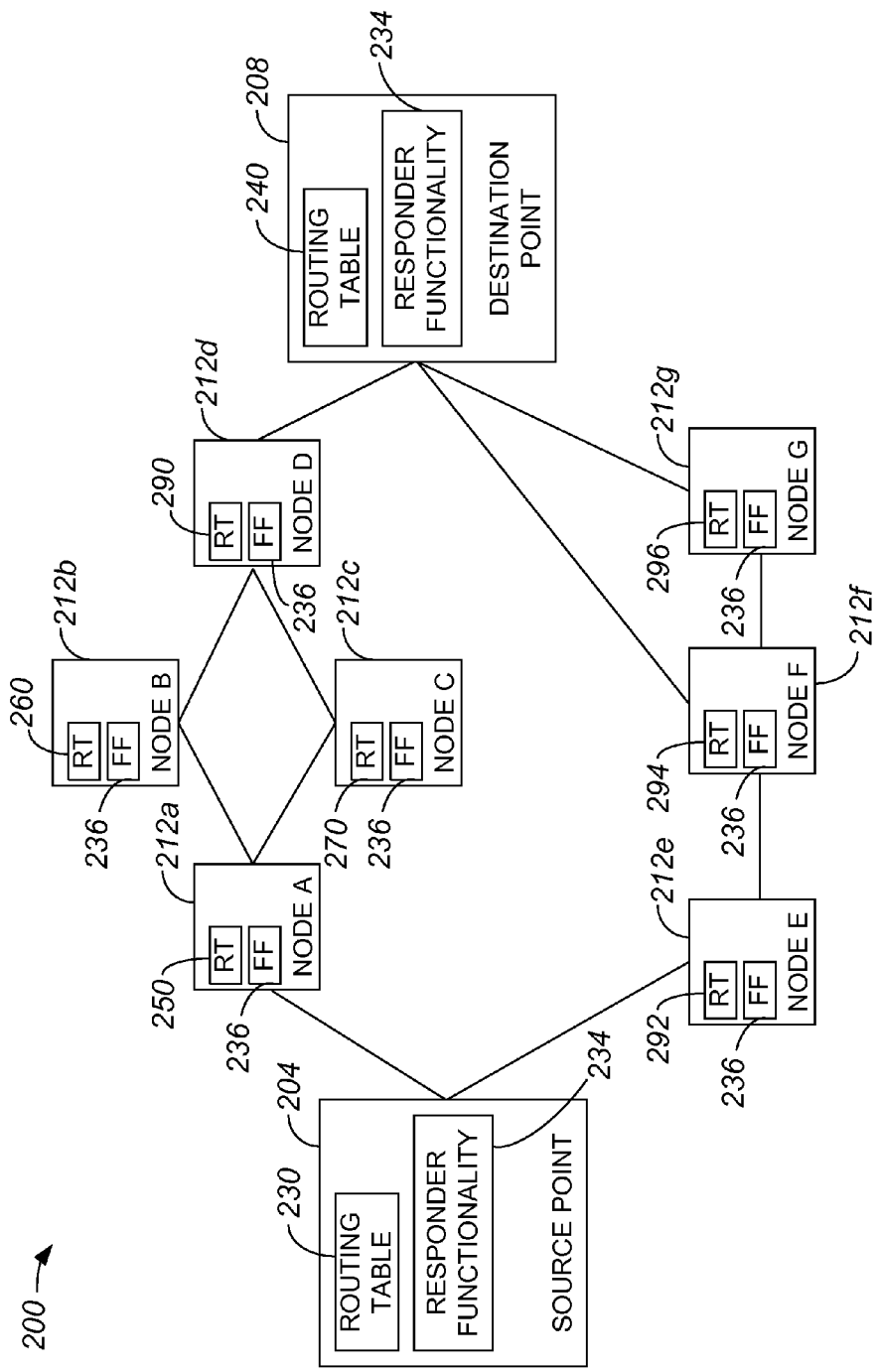
FIG. 2 is a diagrammatic representation of a core network in which intermediate nodes between a source point and a destination point each include forwarder functionality in accordance with an embodiment of the present invention.

By identifying a path traversed by a probe packet, and also characteristics of the path such as the amount of time the probe packet spends at each node in the path, the path may effectively be characterized. At each intermediate node in a path, forwarder functionality allows the payload of a packet, e.g., a probe packet, to be augmented to facilitate the subsequent characterization of a path traversed by the probe packet. FIG. 2 is a diagrammatic representation of a network in which each node has forwarder or responder functionality in accordance with an embodiment of the present invention. A network 200 includes a source point 204, which is an endpoint node that is arranged to initiate a probe packet, and a destination point 208, which is an endpoint node that is arranged to be the target of the probe packet. In one embodiment, network 200 is a service provider network and is protected by a firewall (not shown). Source point 204, destination point 208 include a responder functionality block 234, and nodes 212a-g each include a forwarder functionality block 236.

Responder functionality block 234 provides functionality that allows a node on which it is included, e.g., a source point 204, to augment probe packets. Forwarding or forwarder functionality block 236 also provides functionality that allows a node on which it is included, e.g., any of intermediate nodes 212a-g, to augment probe packets. In one embodiment, responder functionality block 234 and forwarder functionality block 236 may include substantially the same functionality. Augmenting a probe packet generally includes updating a payload of the probe packet such that the payload contains information associated with a node. By way of example, responder functionality block 234 included on source point 204 enables information associated with source point 204 to be added or otherwise provided to the payload of the probe packet. Such information includes, but is not limited to, an address associated with source point 204, timestamps associated with transmitting and/or receiving a probe packet, and interface characteristics associated with the source point 204. It should be appreciated that information that is not necessarily associated with source point 204, e.g., a time-to-live (TTL) value, may be added to the probe packet by responder functionality block 234.

Forwarder functionality block 236 is arranged to augment a probe packet in a similar manner as responder functionality block 234. Forwarder functionality block 236 of each node, as for example node 212a, may update the payload of a probe packet by adding an indication of its address, adding an ingress or arrival time for the packet at that node, e.g., node 212a, adding information related to packet loss at that node, and/or information associated with an input interface and an output interface on which the packet is received and sent, respectively, by the node. As the destination is the next hop, the probe packet is received by node 212a, and a new packet is effectively recreated for the next hop, e.g., node 212b, this new packet contains the information of the incoming probe packet in addition to information associated with node 212a.

It should be appreciated that adding an indication of the address of a node 212a-g to the payload of a probe packet may include adding an IP address of the node 212a-g. Forwarder functionality block 236 may also augment a TTL value, and determine if a TTL for a packet has expired. In the described embodiment, forwarder functionality block 236 may identify the next hop to which a packet is to be sent. Such an identification may be made using source routing lists stored on nodes 212a-g.

Routing table 230, which is included on source point 204, provides routing information that may be used by source point 234 to identify hops in a path to destination point 208 or substantially any other paths within network 200. It should be appreciated that routing table 230, in a strict source routing environment, may effectively specify every intermediate node 212*a-g* that is to be traversed by a packet in a given path between source point 204 and destination point 208. Alternatively, in a loose source routing environment, routing table 230 may specify intermediate nodes 212*a-g* that are to be traversed by a packet in a given path between source point 204 and destination point 208, but may not specify substantially every intermediate node 212*a-g* that is to be traversed.

When source point 204 transmits a packet to destination point 208, the first hops or nodes 212*a-g* traversed by the packet may be determined using routing table 230. In the embodiment as shown, source point 204 may determine through routing table 230 that the first hops in paths to destination point 208 involve either node 212*a* or node 212*e*. Hence, source point 204 transmits the probe packet to both node 212*a* and node 212*e*. Node 212*a* and node 212*e* augment their probe packets, and using routing table 250 and routing table 292, node 212*a* and node 212*e*, respectively, identify next hops of equal cost paths over which to transmit an augmented probe packet.

Node 212*a* identifies next hops to be nodes 212*b* and 212*c*. Each of these nodes 212*b* and 212*c*, upon receiving and augmenting a probe packet, may use its respective routing tables 260 and 270, respectively, to identify the next hop which, as shown, is node 212*d*. Node 212*d* then augments the probe packets received from nodes 212*b* and 212*c*, identifies destination point 208 as the next hop using routing table 290, and provides the probe packets to destination point 208.

Node 212*e* uses a routing table 292 to identify a next hop in substantially all available paths between node 212*d* and destination point 208 path to be node 212*f*. In turn, node 212*f* uses a routing table 294 to identify node 212*g* as a next hop. Finally, node 212*g* uses a routing table 296 to identify destination point 208 as the next hop in the path that passes through node 212*e*.

Destination point 208, which may include a routing table 240, may use responder functionality block 234 to identify which probe packet is received on a substantially "best" path between source point 204 and destination point 208. The best path may be determined by responder functionality block 234 of destination point 208 as being the path with the least packet loss, the lowest amount of delay, and/or the least amount of jitter. More generally, the best path may be the path that has the highest level of performance associated with a selected SLA parameter.

In lieu of destination point 208 determining a substantially best path between source point 204 and destination point 208, destination point 208 may return each received probe packet back to source point 204. Responder functionally block 234 of source point 204 may then identify a substantially best path between source point 204 and destination point 208. The best path may be determined by responder functionality block 234 of destination point 208 as being the path with the least packet loss, the lowest amount of one-way delay from source point 204 to destination point 208, the lowest round-trip time, and/ or the least amount of jitter.

Figure 3:
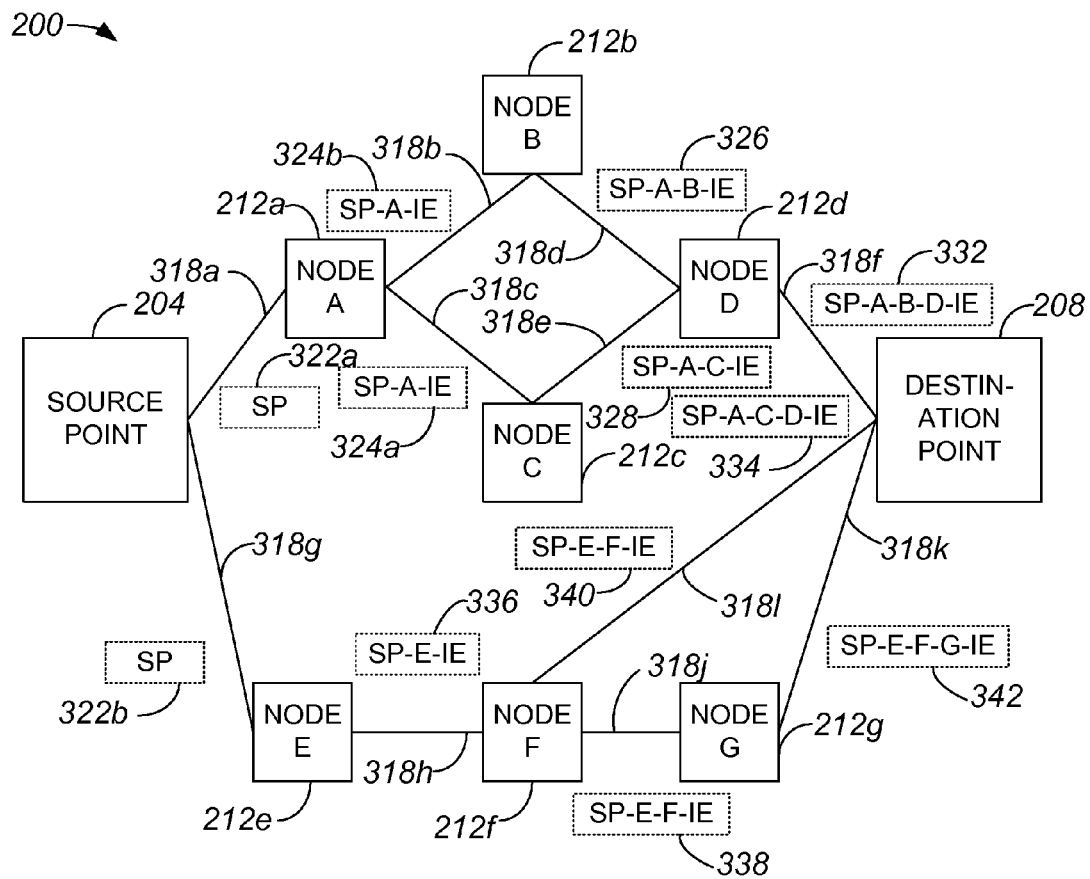
FIG. 3 is a diagrammatic representation of a core network, i.e., core network 200 of FIG. 2, in which a payload of a probe packet sent from a source point is augmented by each intermediate node in accordance with an embodiment of the present invention.

Augmenting a probe packet using forwarder functionality block 236 may include each node 212*a-g* adding its address to a payload of the probe packet, as previously mentioned. Each added address may be an IP address, although it should be appreciated that other types of addresses or identifying information may instead be added to the payload of a probe packet. With reference to FIG. 3, the generation of probe packets that include an address of each node 212*a-g* of paths traversed by the probe packets will be described in accordance with an embodiment of the present invention. Within network 200, source point 204 initiates probe packets 322*a*, 322*b* on each potential path between source point 204 and destination point 208, e.g., using information obtained from a routing table stored on source point 204. Probe packet 322*a*, which includes a payload that identifies an address SP associated with source point 204, is sent on a transmissions segment 318*a*, e.g., a link, to node 212*a*. Probe packet 322*b*, which also includes a payload that identifies an address SP associated with source point 204, is transmitted on a transmissions segment 318*g* to node 212*e*.

Node 212*a* effectively augments probe packet 322*a*, and sends augmented probe packets 324*a*, 324*b* on transmissions segments 318*b*, 318*c*, respectively. Augmented probe packets 324*a*, 324*b* have payloads that specify address SP and an address associated with node 212*a*, i.e., address A. Node 212*a* also adds an ingress time and an egress time relative to node 212*a* to the payload of probe packets 324*a*, 324*b*. When node 212*b* receives augmented probe packet 324*b*, node 212*b* generates augmented probe packet 326 which includes address B of node 212*b*, in addition to address SP and address A. Node 212*b* also adds ingress and egress times associated with node 212*b* to augmented probe packet 326, which also contains ingress and egress times associated with node 212*a*. Similarly, node 212*c* generates augmented probe packet 328 to include address C of node 212*c* as well as ingress and egress times relative to node 212*c*, in addition to address SP and address A, when augmented probe packet 324*a* is received.

Both augmented probe packet 326 and augmented probe packet 328 are provided to node 212*d*. Augmented probe packet 326 is provided on transmissions segment 318*d*, and augmented probe packet 318*e* is provided on transmissions segment 318*e*. When node 212*d* receives both augmented probe packet 326 and augmented probe packet 328, node 212*d* adds its associated address D to generate augmented probe packet 332 and augmented probe packet 334, respectively, which are provided to destination point 208 via transmissions segment 318*f*. Node 212*d* adds an ingress time for probe packet 326 to augmented probe packet 332, as well as an egress time for augmented probe packet 332 to augmented probe packet 332. Similarly, node 212 also adds an ingress time for probe packet 328 to augmented probe packet 334, as well as an egress time for augmented probe packet 334 to augmented probe packet 334. Augmented probe packet 332 includes address SP, address A, address B, address D, and ingress and egress times associated with nodes 212*a*, 212*b*, 212*d*. Augmented probe packet 334 includes address SP, address A, address C, address D, and ingress and egress times associated with nodes 212*a*, 212*c*, 212*d*.

When node 212*e* receives probe packet 322*b*, node 212*e* creates augmented probe packet 336 by adding its associated address E, as well as associated ingress and egress times, and provides packet 336 to node 212*f* on transmissions segment 318*h*. Augmented probe packet 338, which includes address SP, address E, and address F which is associated with node 212*f*, is provided on transmissions segment 318*i* to node 212*g*. Augmented probe packet 340, which is substantially the same as augmented probe packet 338, is provided on transmissions segment 318*l* to destination point 208. Augmented probe packet 338 also includes ingress and egress times associated with node 212*e* and node 212*f*. Finally, node 212*g* forwards augmented packet 342, which includes address SP, address E, address F, and address G which is associated with node 212*g*. Augmented packet 342 also includes ingress and egress times associated with nodes 212*e-g*. Destination point 208 receives packet 340 on transmissions segment 318*j*.

Once destination point 208 receives packets 332, 334, 340, 342 or, more generally, once destination point 208 receives a probe packet on each available and/or functional path between source point 204 and destination point 208, destination point 208 may determine which path is the best path to use. Such a determination may be made based on the information stored in the payload of packets 332, 334, 340, 342. Further, the actual path that is determined to be the best path for a particular SLA parameter may be readily identified, as addresses for the nodes included in each equal cost path are effectively indicated in the payload of each packet 332, 334, 340, 342. Typically, when destination point 208 determines a best path, destination point 208 provides information to source point 204 which may then select the best path as the path to use. Alternatively, in lieu of destination point 208 determining a best path, destination point 208 may return packets 332, 334, 340, 342 to source point 204 such that source point 204 may determine the best path.

Figure 4:
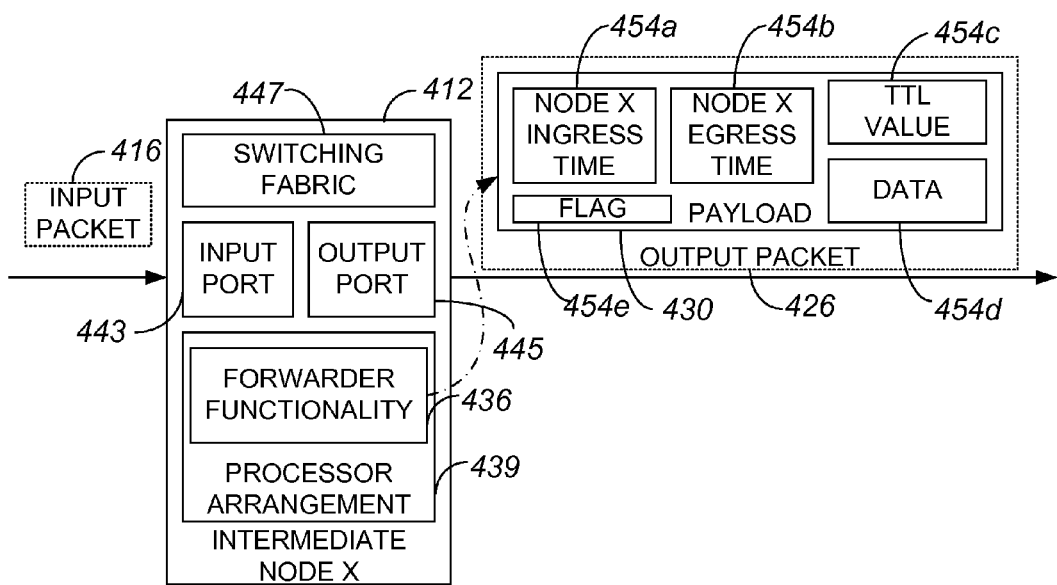
FIG. 4 is a block diagram representation of an intermediate node with forwarder functionality in accordance with an embodiment of the present invention.
Figure 5:
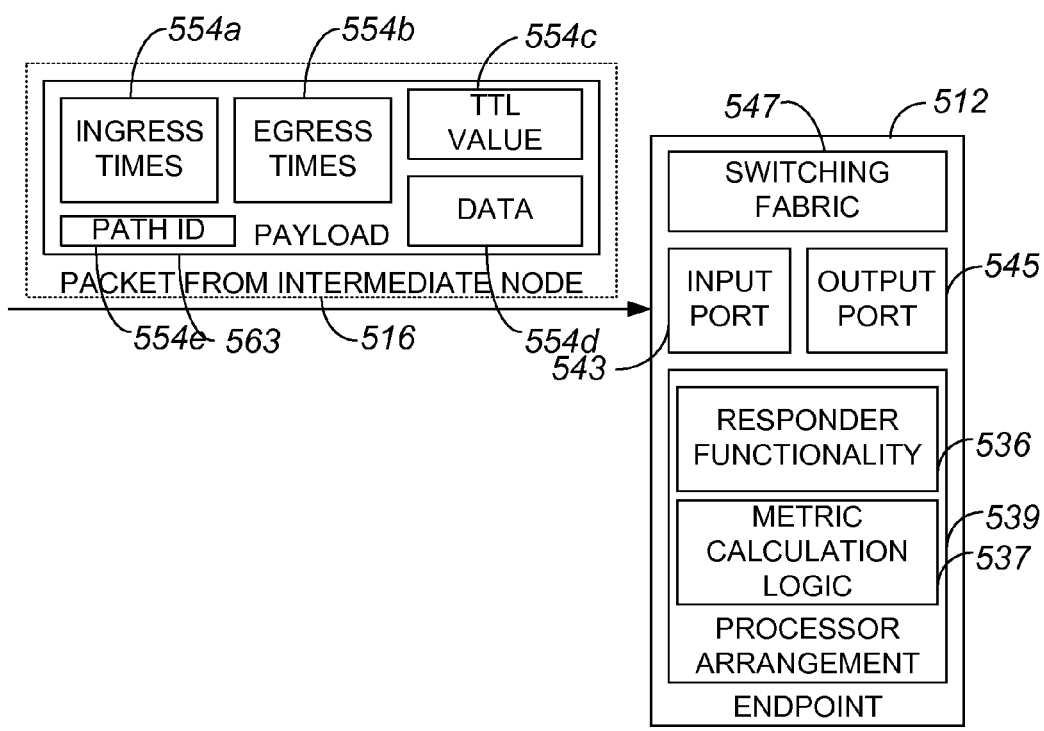
FIG. 5 is a block diagram representation of an endpoint node with responder functionality and metric calculation logic in accordance with an embodiment of the present invention.

In general, a node such as one of nodes 212a-g may be a router or include router functionality, although a node may generally be any suitable network element. FIG. 4 is a block diagram representation of a node with forwarder functionality in accordance with an embodiment of the present invention. A node 412 is arranged to receive an input packet 416 on an input port 443 or interface, to augment input packet 416, and then to transmit an output packet 426 through an output port 445 or interface. Output packet 426 is effectively an augmented or updated version of input packet 416. As will be appreciated by those skilled in the art, input port 443 and output port 445 may be provided by line cards (not shown) installed in node 412. A switching fabric 447 interconnects input port 443 and output port 445.

Output packet 426 includes substantially all information included in input packet 416, and additional information that is stored in output packet 426 by a forwarder functionality block 434 of a processor arrangement 439 that includes executable software and/or hardware logic that is embodied in a tangible medium. Processor arrangement 439 is generally arranged to support a routing protocol, e.g., a strict source routing protocol or a loose source routing protocol, and to create a forwarding table (not shown) that is used for packet forwarding. Forwarder functionality block 434 is arranged to identify input packet 416 as being a probe packet, and to add information 454a-e to a payload 430 of output packet 426.

Information 454a-e added by forwarder functionality block 434 generally includes an ingress time 434a, or an approximate time at which input packet 416 is received by or arrives at input port 443. An egress time 434b written into payload 430 is an approximate time at which output packet 426 is transmitted out of or otherwise leaves output port 445. An address 434c of node 412 is stored in payload 430 by responder functionality block 434. A TTL value 454c may be included in information 454a-e, and may be one less than a TTL value (not shown) associated with input packet 416.

Data 454d, which may include interface information, is also stored in information 454a-e. Interface information identifies input port 443 as the interface on which input packet 416 is received or otherwise obtained by node 412, and identifies output port 445 as the interface on which output packet 426 leaves node 412. A flag 454e is an indicator that indicates that output packet 426 was augmented by or passed through node 412. Although flag 454e may be an IP address of node 412, flag 454e may instead be a media access control (MAC) address for node 412 or substantially any indicator that identifies packet 426 as having been augmented by node 412.

It should be appreciated that payload 430 may also include information that is not added by node 412. By way of example, payload 430 may include ingress and egress times, as well as node addresses, for a node (not shown) that provides input packet 416 to node 412. Further, data 454d may include an indicator that effectively notifies a node (not shown) that receives output packet 426 that output packet 426 is to be substantially replicated for transmission on each segment of any path that is associated with the node (not shown) and is arranged to reach a predetermined destination point (not shown). That is, data 454d may be arranged to inform other nodes with forwarder functionality (not shown) that output packet 426 is a probe packet that is to be augmented and transmitted on each segment of a path between a given source point and a given destination point.

In one embodiment, intermediate nodes such as intermediate node 412 include forwarder functionality block 426 while endpoint nodes, e.g., source point 204 and destination point 208 of FIG. 2, have a responder functionality block FIG. 4 is a block diagram representation of a node with responder functionality in accordance with an embodiment of the present invention. A node 512 is arranged to receive a packet 516 on an input port 443 or interface. Packet 516 may be received from an intermediate node, or a node with a forwarder functionality block. Node 512 includes an output port 445 or interface that may be used to forward packet 516, as for example back to a source. Output port 445 may generally be used to forward substantially any packet obtained, or created by, node 512. If packet 516 is to be forwarded to a source, node 512 may add information to a payload 563 of packet 516 prior to forwarding packet 516. A switching fabric 57 interconnects input port 443 and output port 445.

Node 512 includes a processor arrangement 539 that includes executable software and/or hardware logic that is embodied in a tangible medium that is operable as a responder functionality block 536 and as a metric calculation logic block 537. Responder functionality block 536 is arranged to augment payload 563. Augmenting payload 563 may include, but is not limited to, adding ingress and egress times to payload 563, updating a TTL value 554 in payload 563, and/or updating data 554d in payload 563.

Metric calculation block 539 may use information contained in packet 516 or, more specifically, payload 563 of packet 516, to effectively characterize a path traversed by packet 516. In general, if node 512 is a destination point of a path between a source point and the destination point, the path that is characterized is the path between the source point and the destination point. On the other hand, if node 512 is a source point of a path, then the path that is characterized is the path from node 512 to a destination point. Characterizing the path may include, but is not limited to including, identifying the path using a path identifier 554e or information that identifies nodes that were effectively traversed by packet 516, determining how much time packet 516 spent at each traversed node using ingress times 554a and egress times 554b, and examining data 554d. Data 554d may include information relating to input and output interfaces of traversed nodes. Information stored in payload 563 may be used to determine parameters, e.g., IP SLA parameters, associated with the path identified by path identifier 554e. Such parameters may include jitter, delay, travel time, and packet loss.

Figure 6:
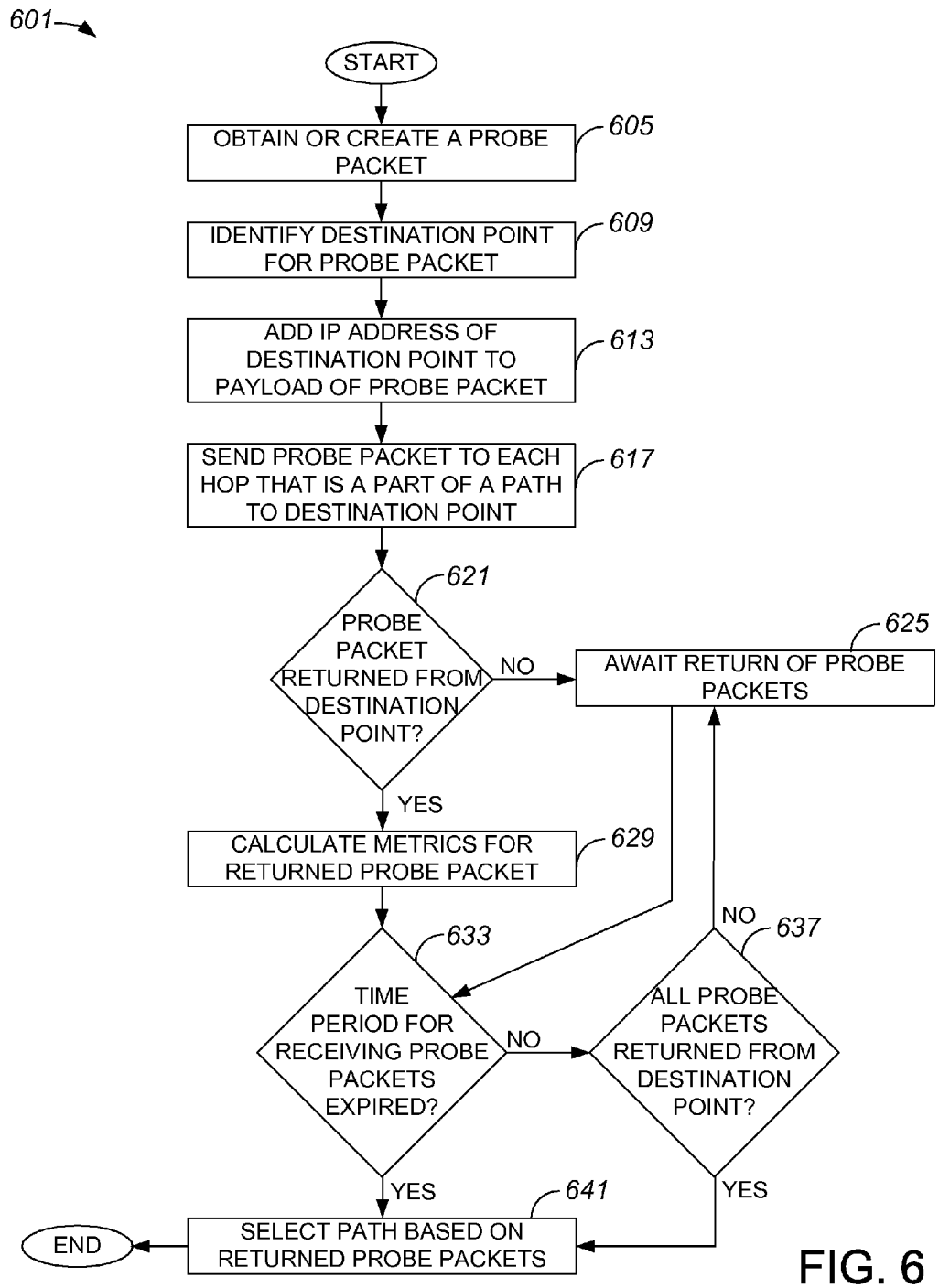
FIG. 6 is a process flow diagram which illustrates one method of processing a probe packet at a source endpoint in accordance with an embodiment of the present invention.

With reference to FIG. 6, one method of processing a probe packet at a source point will be described in accordance with an embodiment of the present invention. A method 601 of initiating transmission of a probe packet using a source point with responder functionality begins at step 605 in which the source point obtains or creates a probe packet. The source point may be a router, e.g., a router with SLA responder functionality. In one embodiment, the probe packet may be obtained from a computing system by the source point when the source point is a router. Obtaining or creating a probe packet may include augmenting a payload of the probe packet with the IP address of the source point, adding a TTL value, and/or adding a hash associated with a shared key. It should be appreciated that when the source point originates a probe packet, the IP address of the source point is typically also included in a header of the probe packet.

After the probe packet is obtained or created, a destination point for the probe packet is identified in step 609. Identifying the destination point for a probe packet may include obtaining information that pertains to the destination point from a message that is to be transmitted via the source point to the destination, or from an administrator who specifies a test destination. In one embodiment, a destination point may be derived from the routing scheme used in the network that includes the destination point. SLAs within a backbone may be established or measured between edge devices associated with a border gateway protocol BGP routing protocol. Hence, destination points may also be identified when a router probes edge devices in border gateway protocol peers.

Once the destination point for the probe packet is identified, an indicator which identifies the destination point, e.g., the IP address of the destination point, is added to the payload of the probe packet in step 613. In step 617, the probe packet is sent to each hop, or intermediate node, that is a part of a path to a destination point. In one embodiment, the next hop to which the probe packet is sent may be identified from a routing table.

In the described embodiment, the source point is arranged to select an actual path for use in sending packets from the source point to a destination point. As such, when the destination point receives a probe packet, the destination point may send the probe packet back to the source point such that the source point may ascertain whether the path traversed by the probe packet is to be selected for use. Hence, a determination is made in step 621 as to whether a probe packet, i.e., a probe packet that was sent in step 617, has been returned from the destination point. If the determination is that no probe packet was returned from the destination point, process flow proceeds to step 625 in which the source point awaits the return of probe packets. From step 625, process flow proceeds to step 633 in which it is determined if a probe packet has been returned or otherwise received from the destination point.

If it is determined that the time period for receiving probe packets has not expired, a determination is made in step 637 regarding whether all probe packets have been returned from the destination point. That is, the source point determines if each probe packet that was sent in step 617 has been received from the destination point. If not all probe packets have been returned from the destination point, then process flow returns to step 625 in which the source point awaits the return of probe packets.

Alternatively, if it is determined that all probe packets have been returned form the destination point in step 637, then the source point selects a path for use between the source point and the destination point in step 641. The selected path may generally be the best path based on a particular parameter. One method of selecting a path based on the returned probe packets will be described below with reference to FIG. 8. Once a path has been selected the processing of a probe packet by a source point is completed.

Referring back to step 633, if it is determined that the time period for receiving probe packets has expired, the indication is that the source point is to make a select a path based on the packets which have already been received. Hence, in step 641, the source point selects a path based on the returned probe packets. Returning to step 621, if the determination is that a probe packet has been returned from the destination point, then metrics for the returned probe packet are calculated in step 629. It should be appreciated that any number of metrics, and any suitable metric, may generally be calculated. As previously mentioned, suitable metrics may include, but are not limited to including, IP SLA parameters such as jitter, packet loss, round-trip time, and delay time on a path traversed by the returned probe packet. After metrics for the returned probe packet are calculated in step 629, it is determined in step 633 if the time period for receiving probe packets is expired.

An intermediate node, or a node that has forwarder functionality and is a hop on a path between a source point and a destination point, processes a probe packet that is received from the source point either directly or indirectly, i.e., from the source point via at least one other intermediate node. The methods used by an intermediate node to process a probe packet may vary widely. By way of example, the methods may vary depending upon whether measures are taken to prevent potential infinite looping and whether an overall network utilizes security. The use of a TTL variable may prevent potential infinite looping. A method of processing a probe packet when a TTL variable is utilized to prevent potential infinite looping will be described below with reference to FIG. 7.

Some networks in which each node has responder or forwarder functionality, routing loops may occur. As previously mentioned, to prevent excessive looping by a probe packet when the probe packet is augmented and transmitted, a TTL value may be included in a payload of the probe packet. By decrementing the TTL value each time the probe packet is augmented, eventually, the TTL value will reach approximately zero, in which case the transmission of the probe packet may be aborted. Hence, the likelihood that a probe packet would effectively loop excessively within a network is reduced.

Figure 7:
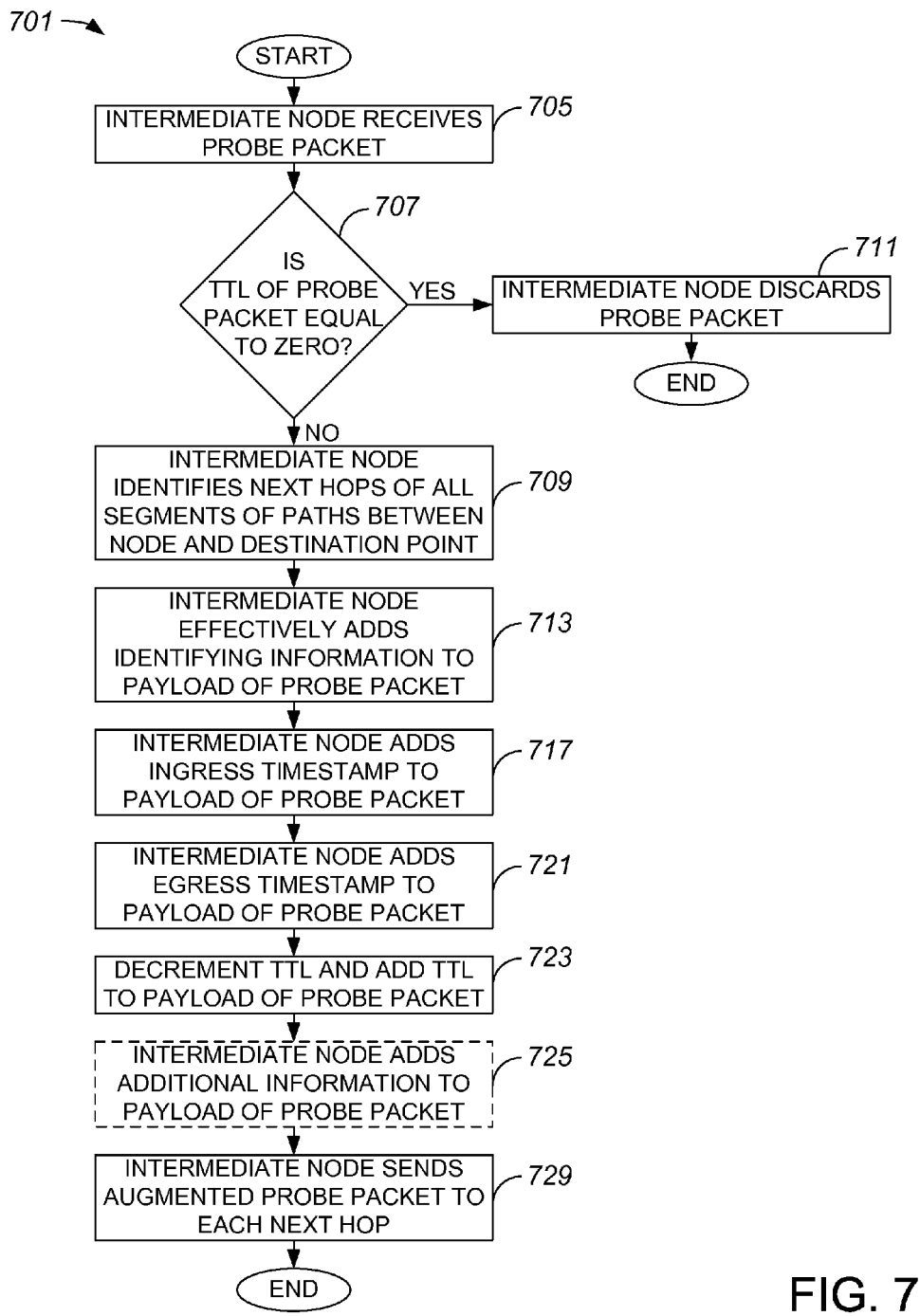
FIG. 7 is a process flow diagram which illustrates a first method of processing a probe packet at an intermediate node with forwarder functionality in accordance with an embodiment of the present invention.

FIG. 7 is a process flow diagram which illustrates a method of processing a probe packet at an intermediate node with forwarder functionality in accordance with an embodiment of the present invention. A method 701 of processing a probe packet at an intermediate node begins at step 705 in which the intermediate node receives a probe packet either directly or indirectly from a source point. The probe packet is generally received on an input port or interface of the intermediate node. After the probe packet is received, it is determined in step 707 whether the TTL value of the probe packet is approximately equal to zero. The TTL value of the probe packet may be obtained from the payload of the received probe packet. If the TTL value of the probe packet is determined to be approximately equal to zero, then the probe packet is considered as being expired. Hence, the probe packet is discarded in step 711, and the processing of a probe packet is completed.

Alternatively, if it is determined in step 707 that the TTL value of the probe packet is not approximately equal to zero, then substantially all next hops of any segments of paths between the router and the destination point are identified in step 707. A path may be identified, in one embodiment, in the probe packet that is to traverse that path. The path to be traversed by the probe packet may also be identified using a routing table associated with the intermediate node.

An identifier for the intermediate node, as for example an IP address of the intermediate node, is added to the payload of the probe packet in step 713. Once the identifier or, more generally, the identifying information for the intermediate node is added to the payload of the probe packet, an ingress timestamp of the probe packet is added to the payload of the probe packet in step 717, and an egress timestamp of the probe packet is added to the payload of the probe packet in step 721. As previously mentioned, adding ingress and egress timestamps to the payload of the probe packet enables delay and jitter associated with a path traversed by the probe packet to be determined.

In step 723, the TTL value obtained from the payload of probe the packet is decremented, and the resulting TTL value is added to the payload of the probe packet. That is, the TTL value stored in the payload is effectively updated. After the TTL value is added to the payload of the probe packet, process flow moves to optional step 725, in which additional information may be added to the payload of the probe packet. The additional information may include substantially any information, e.g., information regarding input and output interfaces of the router. The probe packet is forwarded in step 729 to each next hop that was identified in step 709. The processing of a probe packet is completed once the probe packet is forwarded to each next hop.

Figure 8:
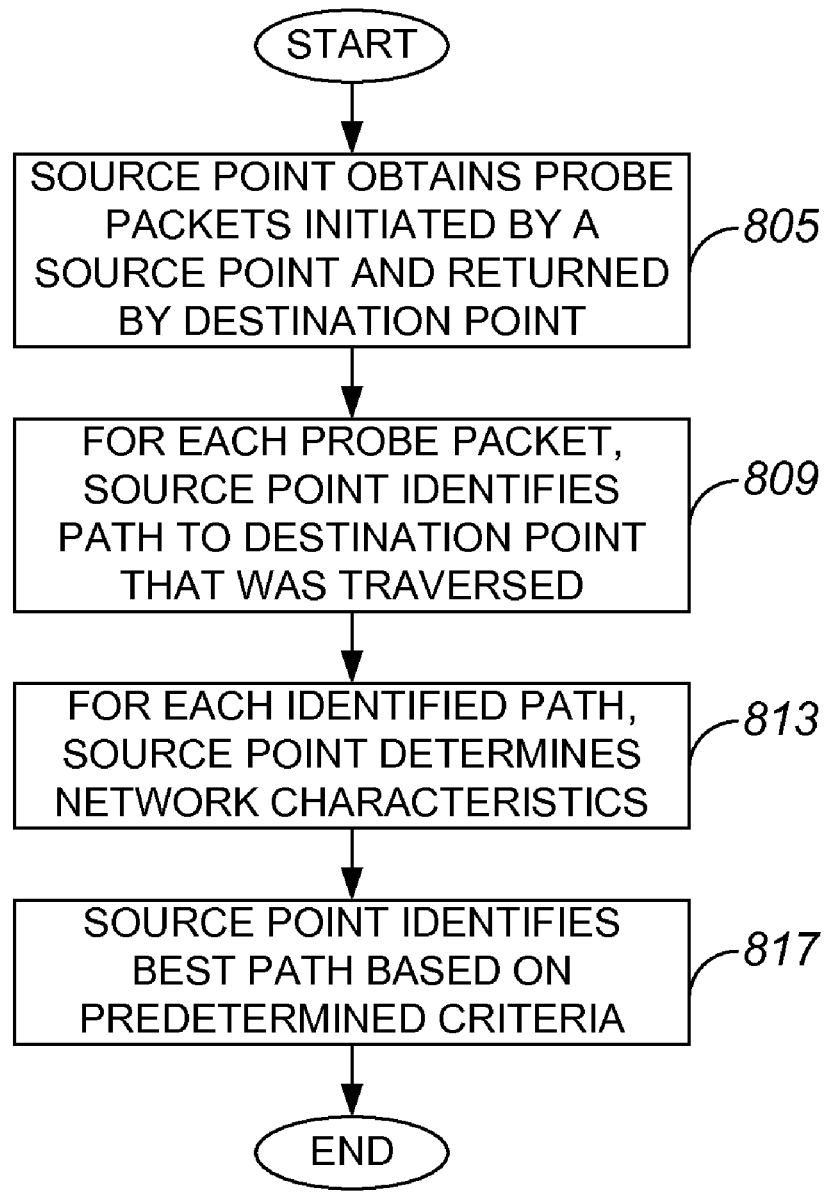
FIG. 8 is a process flow diagram which illustrates a method of selecting a path using probe packets initiated by and returned to a source endpoint, e.g., step 641 of FIG. 6, in accordance with an embodiment of the present invention.

FIG. 8 is a process flow diagram which illustrates a method of selecting a path using probe packets initiated by and returned to a source endpoint, e.g., step 641 of FIG. 6, in accordance with an embodiment of the present invention. A process 641 of selecting a path using information contained in probe packets begins at step 805 in which a source point obtains the probe packets initiated by the source point and returned by a destination point. For each probe packet, the source point identifies in step 809 the path to the destination point that was traversed by the probe packet. The source point may identify a path traversed by a particular probe packet using indicators such as addresses stored in the payload of the probe packet.

Once the paths traversed by each probe packet are identified, the source point determines network characteristics for each identified path in step 813. By way of example, the source point may use the metrics calculated in step 629 of FIG. 6. In general, ingress and egress timestamps may be used to determine network characteristics such as delays or jitter associated with each identified path. After network characteristics are identified, the source point identifies a best path based on at least one predetermined criterion in step 817, and the process of selecting a path is completed. The best path may be identified based on any suitable criterion or factor. By way of example, the performance associated with each identified path may be used to identify the best path. If the predetermined criterion is a round-trip time, the identified path which had the best round-trip time may be identified as the best path. If the predetermined criterion is jitter, the identified path with the least amount of jitter may be identified as the best path.

Figure 9:
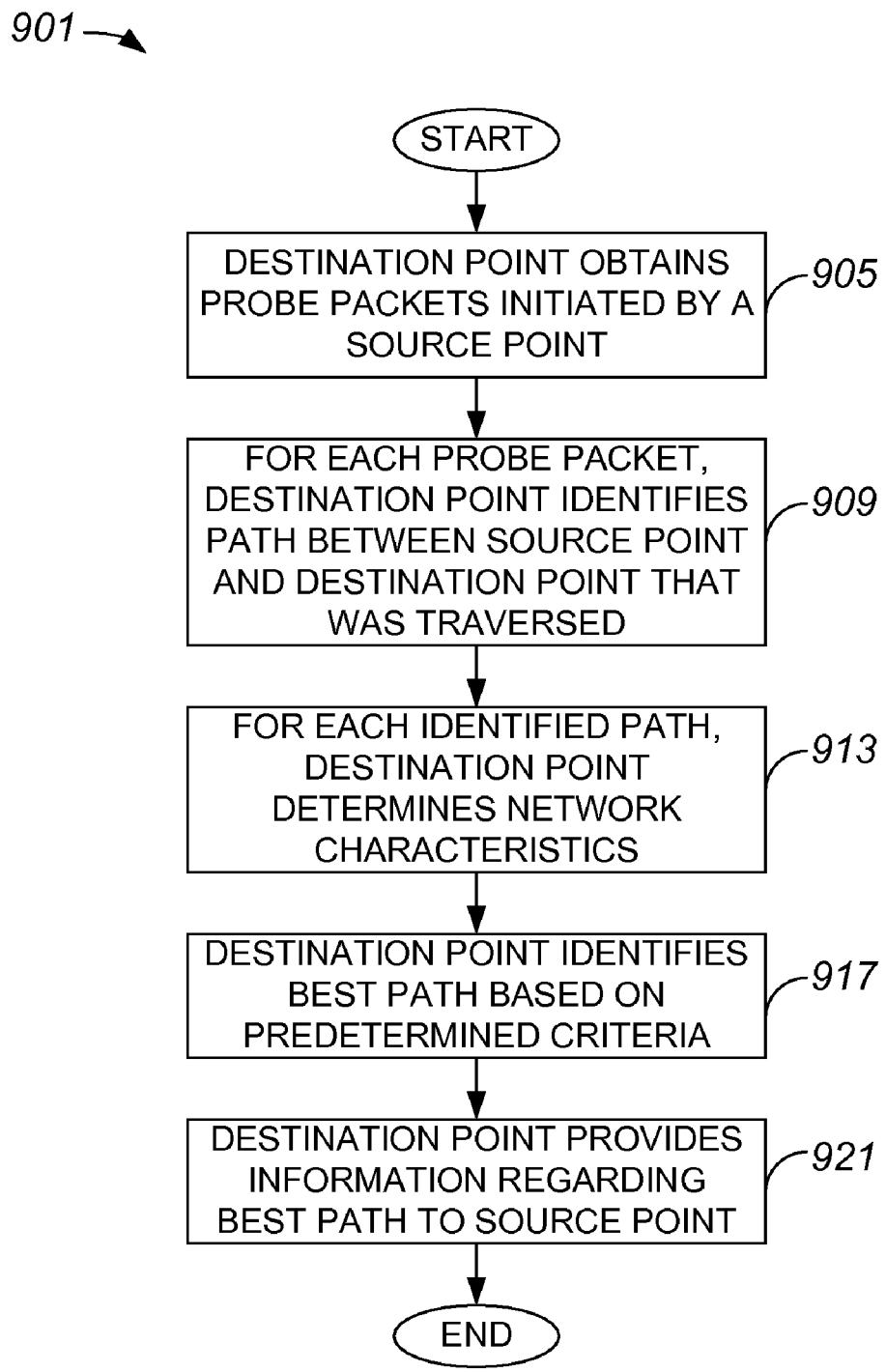
FIG. 9 is a process flow diagram which illustrates a method of selecting a path using probe packets at a destination point in accordance with an embodiment of the present invention.

Although a source point typically selects the best path to a destination point, it should be appreciated that the selection of a best path is not limited to being made by the source point. By way of example, rather than returning probe packets initiated by a source point to the source point such that the source point may select a best path to a destination point, the destination point may instead select a best path, and subsequently provide information relating to the best path to the source point. FIG. 9 is a process flow diagram which illustrates a method of selecting a path at a destination point using probe packets in accordance with an embodiment of the present invention. A method 901 of processing probe packets at a destination point begins at step 905 in which the destination point obtains probe packets initiated by a source point. A probe packet is expected to be received on substantially every available path between the source point and the destination point, although it should be appreciated that, in one embodiment, the source point may limit the number of paths on which a probe packet is sent. The path traversed by each probe packet is identified in step 908.

Typically, the IP address of each intermediate node traversed by a probe packet is contained in the payload of the probe packet. Hence, the destination point may identify the path traversed by a probe packet by reading the payload of the probe packet.

The destination point uses the information stored in the payload of each probe packet to determine network characteristics in step 913 for each of the paths for which a probe packet was received. That is, for each identified path, the destination point determines network characteristics. By way of example, the destination point may use ingress and egress timestamps to determine delays or jitter associated with each path. In step 917, the destination point selects a best path based on a predetermined criterion. By way of example, the performance associated with each of the equal cost paths may be used to identify the best path. After the best path is identified, the destination point provides the information regarding which equal cost path is the best path to the source point in step 921. The information may be provided to the source point, in one embodiment, when the destination point sends a message to the source point that contains the IP addresses of the routers included in the best path. However, it should be appreciated that the information may be provided to the source point using a variety of different methods. Upon providing information regarding the best path to a source point, the processing of probe packets by a destination point is completed.

Although only a few embodiments of the present invention have been described, it should be understood that the present invention may be embodied in many other specific forms without departing from the spirit or the scope of the present invention. By way of example, a probe packet is described as being received by a destination point for each path between a source point and the destination point that. In some instances, a probe packet may not be received for a particular path due to packet loss. In other instances, a probe packet may not be received when an intermediate link or node in a path has a failure. Hence, while a destination point expects to receive a probe packet for each path between a source point and the destination point, a probe packet may generally be received for each cost path on which a failure has not occurred or on which packet loss has not occurred relative to the probe packet.

In lieu of storing an ingress time and an egress time in the payload of a probe packet associated with each node traversed by the probe packet, it should be appreciated that substantially any information that enables at least one of a ingress time and an egress time to be determined may be stored. For example, instead of storing an ingress time and an egress time associated with a node, an ingress time and an amount of time a probe packet remains at the node may be stored.

Some routing protocols effectively measure the cost of a path by counting the number of traversed hops, as previously mentioned. However, other metrics may be used in order to compute the cost of paths. Metrics may include, but are not limited to, numerical values assigned to each link that a path traverses such that the cost of the path is the sum of the cost of substantially all links belonging to the path. A router may, in one embodiment, determines which equal cost path to use to route a packet from a source to a destination using a typically non-predictable load-balancing mechanism.

In general, probe packets received by a node with forwarder functionality are updated or augmented by the node. Updating or augmenting probe packets may include either modifying the actual received probe packets or regenerating substantially new probe packets that include the information provided by a previous probe packet as well as new information.

Network characteristics that are determined using information stored in the packet of a payload have generally been described as including packet loss, delay, and jitter. The network characteristics may be substantially any characteristics. Such characteristics may include, but are not limited to, packet misordering, packet duplication, and packet corruption. Further, the information stored in the payload of a packet may include information in addition to, or in lieu of, timestamps, TTL values, addresses, interface information, and shared key information without departing from the spirit or the scope of the present invention.

Rather than utilizing a probe specific TTL mechanism, each time an intermediate node, e.g., a router, receives a probe packet, the router may extract a value from the TTL field of the IP header of the probe packet. The router may extract the value, subsequently decrement the value, and utilize the value as the TTL value of and outgoing probe packet.

Intermediate nodes which have forwarder functionality, and endpoint nodes which have responder functionality, have been described as being routers. However, it should be appreciated that a node with forwarder and/or responder functionality may be substantially any network element. That is, nodes that may augment the payload of a probe packet are not limited to being routers.

The present invention may be embodied at least in part as code devices or computer code which, in cooperation with processing arrangements, may be executed to enable responder functionality. Typically, forwarder and responder functionality may be implemented as software logic, hardware logic, or a combination of both software logic and hardware logic.

The steps associated with the methods of the present invention may vary widely. Steps may be added, removed, altered, combined, and reordered without departing from the spirit of the scope of the present invention. By way of example, the use of a TTL value and a hash for a shared key, i.e., a hash key in an embodiment in which network security uses cryptography, may be implemented such that both a TTL value and a hash are utilized. If a probe packet contains a hash for a shared key, i.e., a shared key associated with a node, then the probe packet may be processed by the node. Therefore, the present examples are to be considered as illustrative and not restrictive, and the invention is not to be limited to the details given herein, but may be modified within the scope of the appended claims.

What is claimed is:

1. A method comprising:
   obtaining a first packet, the first packet being obtained by a destination point, the first packet having a first payload, the first payload being arranged to identify a first path between endpoints traversed by the first packet, the first payload including first identifying information associated with a first node associated with the first path traversed by the first packet, wherein the first identifying information includes a first arrival time arranged to identify approximately when the first packet arrived at the first node and a first leaving time arranged to identify approximately when the first packet left the first node;
   determining at least a first service level agreement (SLA) parameter of the first path using the first identifying information, wherein determining the first SLA parameter of the first path includes the destination point analyzing at least the first arrival time and the first leaving time;
   comparing the first SLA parameter of the first path with a second SLA parameter associated with a second path traversed by a second probe packet between the endpoints, wherein the destination point compares the first SLA parameter and the second SLA parameter; and
   selecting the first path for sending packets between the endpoints if the first SLA parameter indicates a higher SLA level than indicated by the second SLA parameter, wherein the first path is selected by the destination point.

2. The method of claim 1 wherein the first SLA parameter is one selected from the group including packet loss, a round trip time, a one-way delay indication, and jitter.

3. The method of claim 1 further including:
   obtaining the second packet, the second packet being obtained by the destination point, the second packet having a second payload, the second packet including second identifying information associated with a second node traversed by the second packet, wherein the second identifying information includes a second arrival time arranged to identify approximately when the second packet arrived at the second node and a second leaving time arranged to identify approximately when the second packet left the second node; and
   determining at least the second SLA parameter of the second path using the second identifying information, wherein determining the second SLA parameter of the second path includes the destination point analyzing at least the second arrival time and the second leaving time.

4. The method of claim 1 wherein the first identifying information further includes an indication of the first node, an indication of an input interface of the first node, an indication of an output interface of the first node, and information that indicates packet loss associated with the first node.

5. The method of claim 1 wherein determining at least the first SLA parameter includes the destination point calculating at least one metric associated with the first path, the first path having a different cost from the second path.

6. The method of claim 1 wherein obtaining the first packet includes receiving the first packet from the first node, the first packet being received by the destination point, the first node including forwarder functionality arranged to store the first arrival time and a second arrival time in the first payload.

7. Logic encoded in one or more non-transitory media for execution by a processing arrangement and, when executed, operable to:
   obtain a first packet, the first packet having a first payload, the first payload being arranged to identify a first path between endpoints traversed by the first packet, the first payload including first identifying information associated with a first node associated with the first path traversed by the first packet, wherein the first identifying information includes a first arrival time arranged to identify approximately when the first packet arrived at the first node and a first leaving time arranged to identify approximately when the first packet left the first node;
   determine at least a first service level agreement (SLA) parameter of the first path using the first identifying information, wherein the logic operable to determine the first SLA parameter of the first path includes logic operable to analyze at least the first arrival time and the first leaving time;
   compare the first SLA parameter of the first path with a second SLA parameter associated with a second path traversed by a second probe packet between the endpoints; and select the first path for sending packets between the endpoints if the first SLA parameter indicates a higher SLA level than indicated by the second SLA parameter.

8. The logic of claim 7 wherein the first SLA parameter is one selected from the group including packet loss, a round trip time, a one-way delay indication, and jitter.

9. The logic of claim 7 further operable to:
obtain the second packet, the second packet having a second payload, the second packet including second identifying information associated with a second node traversed by the second packet, wherein the second identifying information includes a second arrival time arranged to identify approximately when the second packet arrived at the second node and a second leaving time arranged to identify approximately when the second packet left the second node; and
determine at least the second SLA parameter of the second path using the second identifying information, wherein the logic operable to determine the second SLA parameter of the second path includes logic operable to analyze at least the second arrival time and the second leaving time.

10. The logic of claim 7 wherein the first identifying information further includes an indication of the first node, an indication of an input interface of the first node, an indication of an output interface of the first node, and information that indicates packet loss associated with the first node.

11. The logic of claim 7 wherein the logic operable to determine at least the first SLA parameter includes logic operable to calculate at least one metric associated with the first path, the first path having a different cost than the second path.

12. The logic of claim 7 wherein the logic operable to obtain the first packet includes logic operable to receive the first packet from the first node, the first node including forwarder functionality arranged to store the first arrival time and the second arrival time in the first payload.

13. An apparatus comprising:
a first interface arranged to obtain a plurality of packets, the plurality of packets including a first packet having a first payload, the first packet being obtained from a first node of a first path; and
a processor, the processor including a metric calculation block, the metric calculation block being arranged to determine at least a first metric associated with the first path using the first payload, the metric calculation block further being arranged to determine if the first metric associated with the first path is of a higher quality level than a second metric, wherein the second metric is not associated with the first path, the metric calculation block still further being arranged to select the first path for use in sending data between a first endpoint and a second endpoint if it is determined that the first metric associated with the first path is of the higher quality level than the second metric, and wherein the first payload includes a first ingress timestamp that indicates when the first packet entered the first node, a first egress timestamp that indicates when the first packet exited the first node, and information associated with a first input interface of the first node and a first output interface of the first node, and wherein the first ingress timestamp, the first egress timestamp, and the information are used to determine the first metric, the information associated with the first input interface of the first node and the first output interface of the first node being arranged to indicate a packet loss associated with the first node.

14. The apparatus of claim 13 wherein the first payload further includes a second ingress timestamp that indicates when the first packet entered a second node of the first path, a second egress timestamp that indicates when the first packet exited the second node, and data associated with a second input interface of the second node and second output interface of the second node, and wherein the second ingress timestamp, the second egress timestamp, and the data are further used to determine the first metric.

15. The apparatus of claim 13 wherein the first metric is one selected from the group including the packet loss, a round trip time, a one-way delay indication, and jitter.

16. The apparatus of claim 13 wherein the plurality of packets include a second packet having a second payload, the second packet being obtained from a second node of a second path, and wherein the first path and the second path are not equal cost paths.

17. The apparatus of claim 16 wherein the second metric is associated with the second path and the metric calculation block is arranged to determine the first metric and the second metric to compare the first path to the second path using the first payload and the second payload.

18. The apparatus of claim 13 wherein the first interface is arranged to obtain the plurality of packets by receiving the first packet from the first node and to receive a second packet of the plurality of packets from a second node, wherein the first packet and the second packet both originated from the first endpoint.

19. An apparatus comprising:
means for obtaining a first packet, the first packet having a first payload, the first payload being arranged to identify a first path between endpoints traversed by the first packet, the first payload including first identifying information associated with a first node associated with the first path traversed by the first packet, wherein the first identifying information includes a first arrival time arranged to identify approximately when the first packet arrived at the first node and a first leaving time arranged to identify approximately when the first packet left the first node;
means for determining at least a first service level agreement (SLA) parameter of the first path using the first identifying information, wherein the means for determining the first SLA parameter of the first path include means for analyzing at least the first arrival time and the first leaving time;
means for comparing the first SLA parameter of the first path with a second SLA parameter associated with a second path traversed by a second probe packet between the endpoints; and
means for selecting the first path for sending packets between the endpoints if the first SLA parameter indicates a higher SLA level than indicated by the second SLA parameter.

20. The method of claim 1 wherein the first node is not associated with the second path, the method further including:
providing at least one of the endpoints with information regarding the first path when the first path is selected for sending the packets between the endpoints, the at least one of the endpoints including a source point of the first packet, wherein the information regarding the first path identifies the first node as being included in the first path and identifies the first path as being selected for sending the packets between endpoints.

21. The method of claim 20 wherein providing the at least one of the endpoints with information regarding the first path includes providing a source of the first packet with the information in a message.

22. The apparatus of claim 13 wherein the plurality of packets include a second packet having a second payload, the second packet being obtained from a second node of a second path, the second path being different from the first path, and wherein the first path and the second path are equal cost paths.

* * * * *